(12) United States Patent
Petrocelli

(10) Patent No.: US 9,047,301 B2
(45) Date of Patent: Jun. 2, 2015

(54) METHOD FOR OPTIMIZING THE MEMORY USAGE AND PERFORMANCE OF DATA DEDUPLICATION STORAGE SYSTEMS

(75) Inventor: Robert Petrocelli, Westerly, RI (US)

(73) Assignee: GREENBYTES, INC., Ashaway, RI (US)

( * ) Notice: Subject to any disclaimer, the term of this patent is extended or adjusted under 35 U.S.C. 154(b) by 515 days.

(21) Appl. No.: 13/088,471

(22) Filed: Apr. 18, 2011

(65) Prior Publication Data

US 2011/0258374 A1    Oct. 20, 2011

Related U.S. Application Data

(60) Provisional application No. 61/325,450, filed on Apr. 19, 2010, provisional application No. 61/325,442, filed on Apr. 19, 2010.

(51) Int. Cl.
| | |
|---|---|
| *G06F 7/06* | (2006.01) |
| *G06F 17/30* | (2006.01) |
| *G06F 3/06* | (2006.01) |

(52) U.S. Cl.
CPC .......... *G06F 17/3015* (2013.01); *G06F 3/0601* (2013.01); *G06F 3/0608* (2013.01); *G06F 3/0641* (2013.01); *G06F 3/065* (2013.01); *G06F 3/067* (2013.01)

(58) Field of Classification Search
CPC ............................ G06F 3/0601; G11C 7/1006
USPC ........................................... 707/705; 711/114
See application file for complete search history.

(56) References Cited

U.S. PATENT DOCUMENTS

| | | | |
|---|---|---|---|
| 6,986,015 B2 | 1/2006 | Testardi | |
| 7,707,217 B2* | 4/2010 | Allwright et al. | ............. 707/758 |
| 7,739,239 B1 | 6/2010 | Cormie et al. | |
| 2002/0107860 A1* | 8/2002 | Gobeille et al. | ............. 707/101 |
| 2004/0210571 A1* | 10/2004 | Shin | .................. 707/3 |
| 2007/0156842 A1 | 7/2007 | Vermeulen et al. | |
| 2009/0271412 A1* | 10/2009 | Lacapra et al. | ................. 707/10 |
| 2010/0088296 A1* | 4/2010 | Periyagaram et al. | ........ 707/705 |
| 2010/0088349 A1* | 4/2010 | Parab | ............................. 707/802 |
| 2010/0174731 A1 | 7/2010 | Vermeulen et al. | |

* cited by examiner

*Primary Examiner* — Aimee Li
*Assistant Examiner* — Trang Ta
(74) *Attorney, Agent, or Firm* — Barlow, Josephs & Holmes, Ltd.

(57) ABSTRACT

A method and system of optimizing the memory usage and performance of data deduplication storage systems includes organizing the metadata of data blocks needed by deduplicating storage systems. A three level hierarchy is used. Level 1 stores the metadata on disk along with the user data. Level 2 uses low latency storage (e.g. RAM and Solid State Disks) to cache the on-disk meta data for faster direct access. Level 3 organizes the fingerprints using a Trie and is entirely resident in RAM. Thus, the search, to determine whether a data block is unique or not and a candidate for transfer, can be more efficiency executed and to ensure that the meta data is transactionally secure.

20 Claims, 1 Drawing Sheet

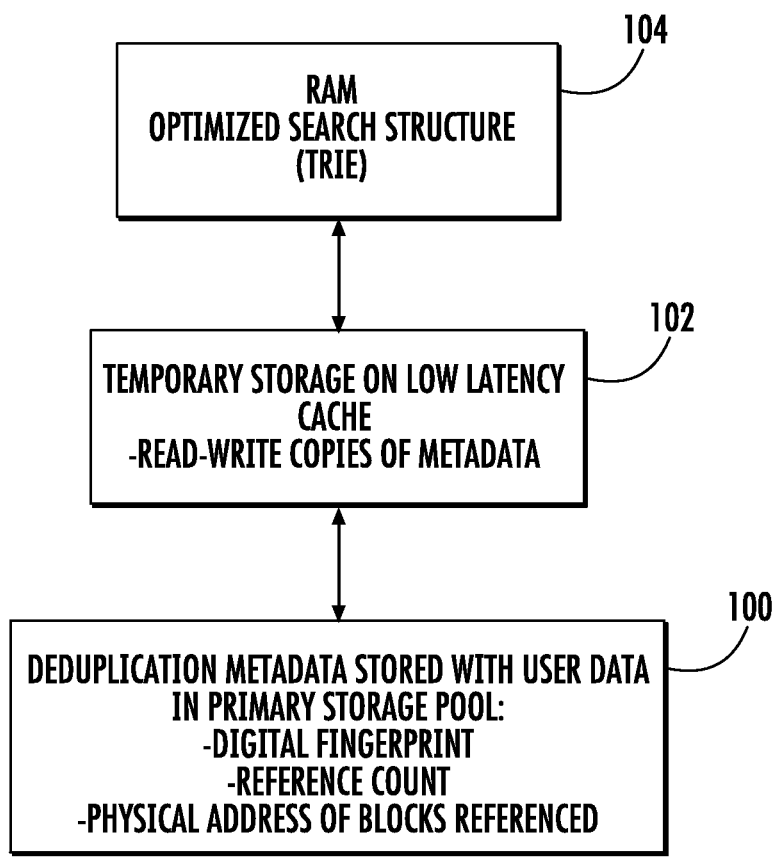

METHOD FOR OPTIMIZING THE MEMORY USAGE AND PERFORMANCE OF DATA DEDUPLICATION STORAGE SYSTEMS

CROSS REFERENCE TO RELATED APPLICATION

The present patent document claims priority to earlier filed U.S. Provisional Patent Application Ser. No. 61/325,450, filed on Apr. 19, 2010, and U.S. Provisional Application Ser. No. 61/325,442, filed on Apr. 19, 2010, the entire contents of which are incorporated herein by reference.

BACKGROUND OF THE INVENTION

The present invention relates generally to a method for a method for the management of meta-data needed to perform data deduplication in data storage systems. The present invention relates to such a method that is implemented in computer software code running on computer hardware.

The operation of computers are very well known in the art. File systems exist on a computer or across multiple computers, where each computer typically includes data storage, such as a hard disk or disk(s), random access memory (RAM) and an operating system for executing software code. Software code is typically executed to carry out the purpose of the computer. As part of the execution of the computer code, storage space on the hard disk or disks and RAM are commonly used. Also, data can be stored, either permanently or temporarily on the hard disk or disks and in RAM. The structure and operation of computers are so well known in the art that they need not be discussed in further detail herein.

In the field of computers and computing, file systems are also very well known in the art to enable the storage of such data as part of the use of the computer. A computer file system is a method for storing and organizing computer files and the data they contain to make it easy to find and access them. File systems may use data storage devices such as a hard disks or CD-ROMs and involve maintaining the physical location of the files, and they might provide access to data by the computer operating system or on a file server by acting as clients for a network protocol (e.g., NFS, SMB, or 9P clients). Also, they may be virtual and exist only as an access method for virtual data.

More formally, a file system is a special-purpose database for the storage, organization, manipulation, and retrieval of data. This database or table, which centralizes the information about which areas belong to files, are free or possibly unusable, and where each file is stored on the disk. To limit the size of the table, disk space is allocated to files in contiguous groups of hardware sectors called clusters. As disk drives have evolved, the maximum number of clusters has dramatically increased, and so the number of bits used to identify each cluster has grown. For example, FAT, and the successive major versions thereof are named after the number of table element bits: 12, 16, and 32. The FAT standard has also been expanded in other ways while preserving backward compatibility with existing software.

File systems are specialized databases, which manage information on digital storage media such as magnetic hard drives. Data is organized using an abstraction called a file, which consists of related data and information about that data (here after referred to as metadata). Metadata commonly consists of information like date of creation, file type, owner, and the like.

The file system provides a name space (or a system) for the unique naming of files. File systems also frequently provide a directory or folder abstraction so that files can be organized in a hierarchical fashion. The abstraction notion of file and folders does not represent the actual physical organization of data on the hard disk only its logical relationships.

Hard disks consist of a contiguous linear array of units of storage referred to as blocks. Blocks are all typically the same size and each has a unique address used by the disk controller to access the contents of the block for reading or writing. File systems translate their logical organization into the physical layer by designating certain address as special or reserved. These blocks, often referred to as super-blocks, contain important information about the file system such as file system version, amount of free space, etc. They also contain or point to other blocks that contain structures, which describe directory and file objects.

One of the most important activities performed by the file system is the allocation of these physical blocks to file and directory objects. Typically each file consists of one or more data blocks. If files are stored on the file-system, which contains identical data blocks, no provision is made to identify that these blocks are duplicates and avoid the allocation of (wasted) space for these duplicate blocks.

Data deduplication is a method in which only unique data is physically kept in a data storage system. The unique data is referenced by a unique "fingerprint" derived from the data often in the form of a cryptographic hash function. Deduplication methods compare the fingerprint of incoming data blocks to the fingerprints of all existing data blocks. If the incoming data block is unique it is stored, if it is not unique it is not stored but is added as a reference to the existing unique data block.

However, in the prior art, a core problem exists relating to the index search needed to determine if a block is unique or a duplicate. As can be understood, such a search becomes more complex as the number of unique blocks in the storage system increase.

The method of the present invention relates to the organization of the meta-data in a search index of data blocks needed to accomplish this search more efficiently.

In view of the foregoing problems, there is a need to minimize the amount of RAM memory needed to accomplish the search.

There is also a need to maximize the performance of the search.

There is yet a further need to ensure that the meta-data used in the search is transactionally secure.

SUMMARY OF THE INVENTION

The present invention preserves the advantages of prior art methods, devices and systems for optimizing the memory usage and performance of data duplication storage systems. In addition, it provides new advantages not found in currently available methods, devices and systems therefor and overcomes many disadvantages of such currently available methods, devices and systems.

The present invention provides a method for organizing metadata needed by deduplicating storage systems. The unique method employs a three level hierarchy is used. Level 1 stores the metadata on disk along with the user data. Level 2 uses low latency storage (e.g. RAM and Solid State Disks) to cache the on-disk meta data for faster direct access. Level 3 organizes the fingerprints using a Trie and is entirely resident in RAM. As a result, memory usage and performance of the data deduplication storage system is optimized and superior to known prior art methods and systems.

Therefore, an object of the invention is to minimize the amount of RAM memory needed to accomplish the search.

Another object of the method of the present invention is to maximize the performance of the search.

A further object of the invention is to ensure that the meta-data used in the search is transactionally secure.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 1 is a flow chart illustrating the process of the present invention.

DETAILED DESCRIPTION OF THE PREFERRED EMBODIMENT

As seen in the attached drawing FIG. 1, details of the preferred embodiment of the method of the present invention are shown.

In accordance with the method of the present invention, memory usage and performance of the data deduplication storage system is optimized by organizing data block meta-data in a manner far superior to prior art methods and systems so that it can be searched more efficiently to determine if a given data block is unique or a duplicate and, thus, whether it should be transferred or copied.

By way of background, there are two primary types of meta-data needed to perform a search as part of a data deduplication process.

The first type is called a Binary Tree, which is organized to facilitate the fast comparison of fingerprints. This is an implementation used to do this comparison. For example, binary trees can be AVL trees, balanced trees, red-black trees, and the like. However, the problem with binary trees is that they consume large amounts of memory and become very inefficient as they grow large.

The second type of data needed to perform deduplication is called data address and reference counts. The actual physical address(es) where data are stored and the number of logical data blocks referencing that data (reference counts) must be known to maintain the integrity of the storage system. For example, a physical block referenced by two logical blocks cannot be deleted from the system until both logical blocks have been removed.

In computer science, a trie, or prefix tree, is an ordered tree data structure that is used to store an associative array where the keys are usually strings. Unlike binary trees, no node in the tree stores the key associated with that node. Instead, its position in the tree shows what key it is associated with. All the descendants of a node have a common prefix of the string associated with that node, and the root is associated with the NULL string. Values are normally not associated with every node, only with leaves and some inner nodes that correspond to keys of interest.

Tries have several advantages over binary search trees. The most important advantage in the context of the present invention is that the worst cast performance of a Trie s 0(m) time, where m is the length of the key while a binary tree has a worst case performance of m log(n) where n is the number of elements in the tree. In the method of the present invention, it is preferred that n>>m. A binary tree must also be rebalanced on each insertion or deletion, a Trie does not require any balancing operations. Because the Trie inherently compresses its keys, the memory requirements are also quite small. In a Trie which is sparsely populated compared to the possible range of its keys the memory required can be as little as 1 bit per key stored. The fingerprints used in deduplication are very sparsely populated. For example, a 256 bit fingerprint has a range of 0 to $2^{256}$, but the number of blocks stored in a large system does not typically exceed $2^{48}$ blocks.

According to the method of the present invention, meta data is divided into three levels to achieve optimal memory and computational performance.

More specifically, the lowest level 100 is the storage of a fingerprint, data address and reference count as a block of meta-data on the disk.

The second level 102 is the use of low latency storage to cache the (on-disk) meta-data blocks for fast access to lookup a fingerprints physical address and reference count.

The third level 104 is a Trie which resides in RAM memory and is used to compare incoming fingerprints to existing fingerprints (which are then referenced through the cache).

The foregoing method where the meta data is divided up into three levels is optimal with respect to performance and memory required. It is an advance over prior art meta data handling. An example of a Trie used by the method of the present invention is called a Judy tree.

In view of the foregoing, a new and unique method for optimizing the memory usage and performance of data deduplication storage systems. Such optimization is achieved by dividing up the meta data into three levels for more efficient handling thereof, namely, minimize the amount of RAM memory to carry out a search while maximizing the performance thereof and ensuring that the meta data used in the search is transactionally secure.

It should be understood that the present invention may be employed in any type of operating system. The present invention may be implemented in any type of software code using any language and can run on any type of computer hardware. This unique method may also be employed for data stored in any type of storage device, such as arrays of storage devices and any type of device, such as magnetic, solid state (such as flash) and optical media.

It would be appreciated by those skilled in the art that various changes and modifications can be made to the illustrated embodiments without departing from the spirit of the present invention. All such modifications and changes are intended to be covered by the appended claims.

What is claimed is:

1. A method for optimizing the memory usage and performance of data deduplication storage systems, said data deduplication storage system having a memory, a low-latency storage, a disk storage location having data blocks and associate meta data stored thereon, the method comprising:

dividing the meta data into a three level hierarchy including a first level that stores the meta data on disk along with the data blocks; a second level that uses low latency storage to cache a copy of the on-disk meta data for faster direct access; and a third level that organizes references to fingerprints using a Trie that is entirely resident in random access memory of the data deduplication storage system, the meta data comprising a fingerprint of the data block, data address of the data block, and a reference count; and conducting a search of the Trie for fingerprints to determine whether a data block is unique or a duplicate within the data deduplication storage system.

2. The method of claim 1, wherein the low latency storage is a random access memory.

3. The method of claim 1, wherein the low latency storage is a solid state disk.

4. The method of claim 1, wherein said Trie is a Judy Trie.

5. A data deduplication system, comprising:
   a storage location having data blocks and associate meta data stored thereon, said meta data comprising fingerprints of the data block, a reference count and a physical address of the data blocks referenced;
   a low latency storage containing a copy of the meta data; and
   a memory containing a searchable trie of fingerprints referencing the copy of the meta data stored in the low-latency storage.

6. The system of claim 5, wherein the low latency storage is a random access memory.

7. The system of claim 5, wherein the low latency storage is a solid state disk.

8. The system of claim 5, wherein said Trie is a Judy Trie.

9. A method for optimizing the memory usage and performance of data deduplication storage systems, said data deduplication storage system having a random access memory, a low-latency storage, a disk storage location having data blocks and associate meta data stored thereon, said meta data comprising a fingerprint of a particular data block, a reference count, and physical address of said particular data block, the method comprising:
   storing data blocks and meta data on a disk storage location within a data deduplication storage system;
   storing a copy of said meta data in said low latency storage of the data deduplication storage system for fast access;
   building and maintaining a Trie consisting of a reference to a fingerprint of said meta data stored in said low latency storage of the data deduplication storage system;
   storing said Trie entirely in random access memory of the data deduplication storage system; and
   conducting a search in said Trie to determine whether a data block is unique or a duplicate in response to a request to copy data blocks to said data deduplication storage system by comparing a fingerprint of said data blocks requested to be copied to said data deduplication storage system to fingerprints of data blocks currently stored in said data deduplication storage system.

10. The method of claim 9, wherein the low latency storage is a random access memory.

11. The method of claim 9, wherein the low latency storage is a solid state disk.

12. The method of claim 9, wherein said Trie is a Judy Trie.

13. A computer program product, comprising a non-transitory computer-readable medium having a computer-readable program code embodied therein, said computer-readable program code adapted to be executed to implement a method for optimizing the memory usage and performance of data deduplication storage systems, said data deduplication storage system having a memory, a low-latency storage, a disk storage location having data blocks and associate meta data stored thereon, the method comprising:
   dividing the meta data into a three level hierarchy including a first level that stores the meta data on disk along with the data blocks; a second level that uses low latency storage to cache a copy of the on-disk meta data for faster direct access; and a third level that organizes references to fingerprints using a Trie that is entirely resident in random access memory of the data deduplication storage system, the meta data comprising a fingerprint of the data block, data address of the data block, and a reference count; and
   conducting a search of the Trie for fingerprints to determine whether a data block is unique or a duplicate within the data deduplication storage system.

14. The computer program product of claim 13, wherein the low latency storage is a random access memory.

15. The computer program product of claim 13, wherein the low latency storage is a solid state disk.

16. The computer program product of claim 13, wherein said Trie is a Judy Trie.

17. A computer program product, comprising a non-transitory computer-readable medium having a computer-readable program code embodied therein, said computer-readable program code adapted to be executed to implement a method for optimizing the memory usage and performance of data deduplication storage systems, said data deduplication storage system having a random access memory, a low-latency storage, a disk storage location having data blocks and associate meta data stored thereon, said meta data comprising a fingerprint of a particular data block, a reference count, and physical address of said particular data block, the method comprising:
   storing data blocks and meta data on a disk storage location within the data deduplication storage system;
   storing a copy of said meta data in said low latency storage of the data deduplication storage system for fast access;
   building and maintaining a Trie consisting of a reference to a fingerprint of said meta data stored in said low latency storage of the data deduplication storage system;
   storing said Trie entirely in random access memory of the data deduplication storage system; and
   conducting a search in said Trie to determine whether a data block is unique or a duplicate in response to a request to copy data blocks to said data deduplication storage system by comparing a fingerprint of said data blocks requested to be copied to said data deduplication storage system to fingerprints of data blocks currently stored in said data deduplication storage system.

18. The computer program product of claim 17, wherein the low latency storage is a random access memory.

19. The computer program product of claim 17, wherein the low latency storage is a solid state disk.

20. The computer program product of claim 17, wherein said Trie is a Judy Trie.

* * * * *